United States Patent
Greenberg et al.

(10) Patent No.: US 10,836,256 B2
(45) Date of Patent: Nov. 17, 2020

(54) ENHANCED TOUCHSCREEN OPERATION

(71) Applicant: Ford Global Technologies, LLC, Dearborn, MI (US)

(72) Inventors: Jeffrey Allen Greenberg, Ann Arbor, MI (US); Brad Alan Ignaczak, Canton, MI (US); John Robert Van Wiemeersch, Novi, MI (US); Adil Nizam Siddiqui, Farmington Hills, MI (US); Patrick Kevin Holub, Novi, MI (US)

(*) Notice: Subject to any disclaimer, the term of this patent is extended or adjusted under 35 U.S.C. 154(b) by 365 days.

(21) Appl. No.: 15/761,132

(22) PCT Filed: Nov. 2, 2015

(86) PCT No.: PCT/US2015/058578
§ 371 (c)(1),
(2) Date: Mar. 19, 2018

(87) PCT Pub. No.: WO2017/078666
PCT Pub. Date: May 11, 2017

(65) Prior Publication Data
US 2020/0238827 A1   Jul. 30, 2020

(51) Int. Cl.
*B60K 37/02* (2006.01)
*G06F 1/16* (2006.01)

(52) U.S. Cl.
CPC .............. *B60K 37/02* (2013.01); *G06F 1/163* (2013.01); *B60K 2370/195* (2019.05); *B60K 2370/197* (2019.05); *B60K 2370/52* (2019.05); *B60K 2370/63* (2019.05); *B60K 2370/741* (2019.05)

(58) Field of Classification Search
CPC .............. B60K 37/02; B60K 2370/195; B60K 2370/197; B60K 2370/741; B60K 2370/52; B60K 2370/63; G06F 1/163
USPC ......................................................... 340/461
See application file for complete search history.

(56) References Cited

U.S. PATENT DOCUMENTS

| | | | |
|---|---|---|---|
| 7,009,488 B2 | 3/2006 | Schwartz et al. | |
| 7,027,621 B1 | 4/2006 | Prokoski | |
| 8,704,651 B2 | 4/2014 | Nix et al. | |
| 9,020,697 B2 | 4/2015 | Ricci et al. | |
| 9,235,941 B2 * | 1/2016 | Ricci ................. | B60H 1/00742 |
| 9,477,332 B2 | 10/2016 | Cuddihy et al. | |
| 9,571,629 B2 * | 2/2017 | Kadous ............. | H04M 1/72577 |
| 2008/0129684 A1 | 6/2008 | Adams et al. | |
| 2010/0280711 A1 | 11/2010 | Chen et al. | |
| 2013/0257804 A1 | 10/2013 | Vu et al. | |

(Continued)

FOREIGN PATENT DOCUMENTS

| | | |
|---|---|---|
| CN | 102262720 A | 11/2011 |
| CN | 104943544 A1 | 9/2015 |

OTHER PUBLICATIONS

China Notification of First Office Action dated Mar. 19, 2020 re Appl. No. 2015800842981.

(Continued)

*Primary Examiner* — John A Tweel, Jr.

(57) ABSTRACT

A location of a first wearable device is determined based on a first biometric signature. Operation of a touchscreen display is restricted if the location of the first wearable device is in an operator's side of a vehicle cabin and the first wearable device is within a first distance from the display.

14 Claims, 4 Drawing Sheets

(56) References Cited

U.S. PATENT DOCUMENTS

2014/0288391 A1    9/2014   Hong et al.
2014/0310739 A1   10/2014   Ricci et al.
2015/0081169 A1    3/2015   Pisz
2015/0288804 A1   10/2015   Kadous

OTHER PUBLICATIONS

Notification of Transmittal of International Search Report and Written Opinion dated Jan. 22, 2016 regarding PCT/US2015/058578 (13 pages).

* cited by examiner

ENHANCED TOUCHSCREEN OPERATION

CROSS-REFERENCE TO RELATED APPLICATIONS

This application is a national stage of, and claims priority to, Patent Cooperation Treaty Application No. PCT/US2015/058578, filed on Nov. 2, 2015, which application is hereby incorporated herein by reference in its entirety.

BACKGROUND

Touchscreen displays allow vehicle occupants to interact with vehicle systems. However, to avoid distracting a vehicle operator, e.g., driver while a vehicle is in operation, touchscreen displays may deactivate completely during vehicle operation, preventing vehicle passengers from using the touchscreen display.

DETAILED DESCRIPTION

Figure 1:
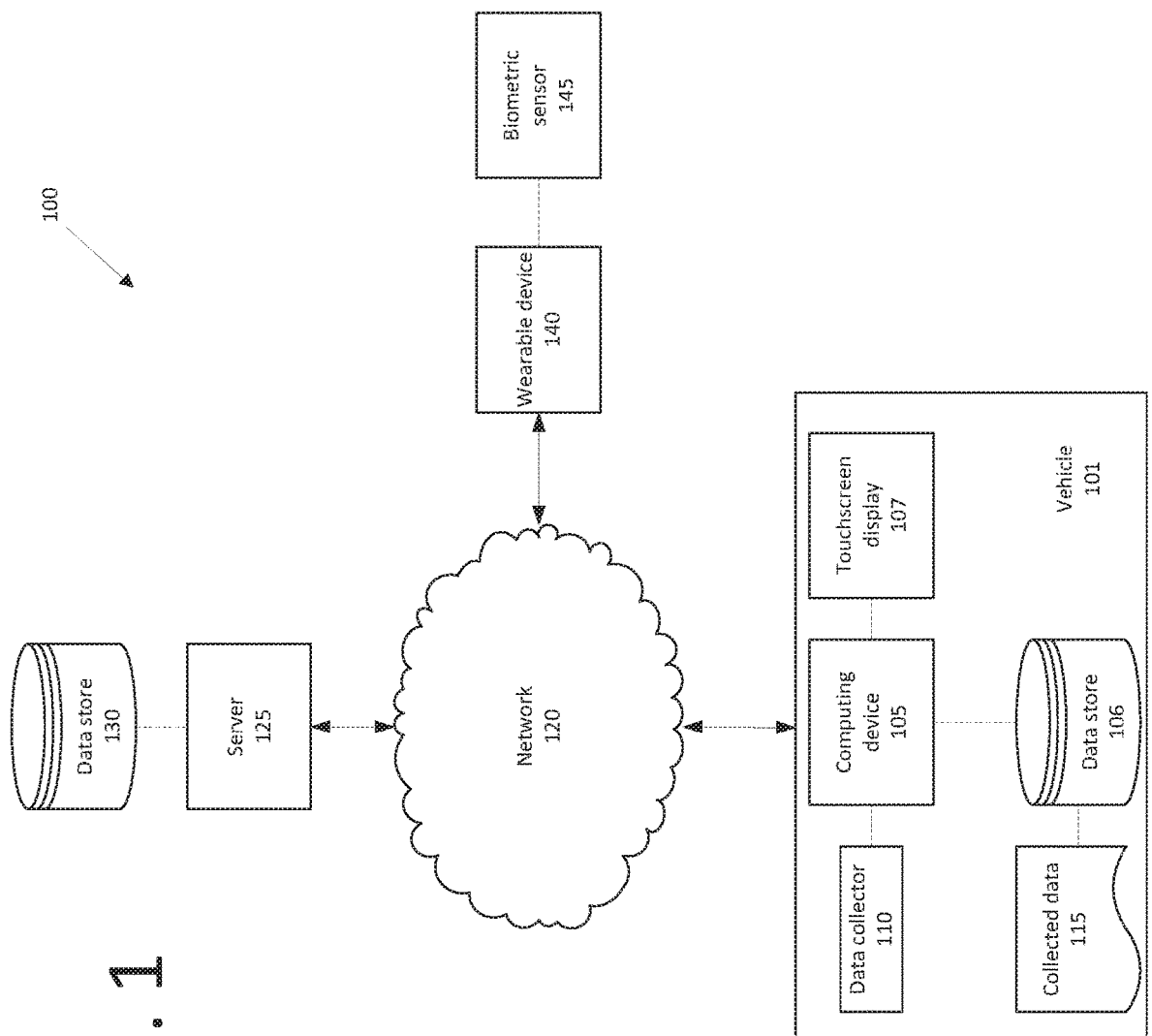
FIG. 1 is a block diagram of an exemplary system for allowing use of a touchscreen display based on a wearable device.

FIG. 1 illustrates a system 100 including a wearable device 140 communicatively coupled to a vehicle 101 computing device 105. The computing device 105 is programmed to receive collected data 115 from one or more data collectors 110, e.g., vehicle 101 sensors, concerning various metrics related to the vehicle 101. For example, the metrics may include a velocity of the vehicle 101, vehicle 101 acceleration and/or deceleration, data related to vehicle 101 path or steering including lateral acceleration, curvature of the road, biometric data related to a vehicle 101 operator, e.g., heart rate, respiration, pupil dilation, body temperature, state of consciousness, etc. Further examples of such metrics may include measurements of vehicle systems and/or components (e.g. a steering system, a powertrain system, a brake system, internal sensing, external sensing, etc.).

The computing device 105 is generally programmed for communications on a controller area network (CAN) bus or the like. The computing device 105 may also have a connection to an onboard diagnostics connector (OBD-II). Via the CAN bus, OBD-II, and/or other wired or wireless mechanisms, the computing device 105 may transmit messages to various devices in a vehicle and/or receive messages from the various devices, e.g., controllers, actuators, sensors, etc., including data collectors 110. Alternatively or additionally, in cases where the computing device 105 actually comprises multiple devices, the CAN bus or the like may be used for communications between devices represented as the computing device 105 in this disclosure. In addition, the computing device 105 may be programmed for communicating with a network 120, which, as described below, may include various wired and/or wireless networking technologies, e.g., cellular, Bluetooth, wired and/or wireless packet networks, etc.

The data store 106 may be of any known type, e.g., hard disk drives, solid-state drives, servers, or any volatile or non-volatile media. The data store 106 may store the collected data 115 sent from the data collectors 110.

The vehicle 101 may include a touchscreen display 107. The display 107 may allow an operator of the vehicle 101 to interface with the computing device 105, with electronic control units, vehicle 101 systems, etc. The display 107 may include interactive voice response (IVR) and/or a graphical user interface (GUI). The display 107 may present information relayed from the network 120, e.g. from a server 125, that extends outside of the vehicle 101 and may communicate directly with the computing device 105, e.g., using Bluetooth, etc.

Data collectors 110 may include a variety of devices. For example, various controllers in a vehicle may operate as data collectors 110 to provide data 115 via the CAN bus, e.g., data 115 relating to vehicle speed, acceleration, system and/or component functionality, etc., of any number of vehicles 101, including the host vehicle and/or the target vehicle. Further, sensors or the like, global positioning system (GPS) equipment, etc., could be included in a vehicle and configured as data collectors 110 to provide data directly to the computer 105, e.g., via a wired or wireless connection. Sensor data collectors 110 could include mechanisms such as RADAR, LIDAR, sonar, etc. sensors that could be deployed to measure a distance between the vehicle 101 and other vehicles or objects. Yet other data collectors 110 could include cameras, breathalyzers, motion detectors, biometric sensors that can detect, e.g., a heartbeat, etc., i.e., data collectors 110 to provide data 115 for evaluating a condition or state of a vehicle 101 operator.

Collected data 115 may include a variety of data collected in a vehicle 101. Examples of collected data 115 are provided above, and moreover, data 115 is generally collected using one or more data collectors 110, and may additionally include data calculated therefrom in the computing device 105, and/or at the server 125. In general, collected data 115 may include any data that may be gathered by the data collectors 110 and/or computed from such data. The collected data 115 may be presented on the display 107.

The system 100 may further include the network 120 connected to the server 125 and a data store 130. The computer 105 may further be programmed to communicate with one or more remote sites such as the server 125, via the network 120, such remote site possibly including a data store 130. The network 120 represents one or more mechanisms by which a vehicle computer 105 may communicate with a remote server 125. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be programmed to determine an appropriate action for one or more vehicles 101, and to provide direction to the computer 105 to proceed accordingly. The server 125 may be one or more computer servers, each generally including at least one processor and at least one memory, the memory storing instructions executable by the processor, including instructions for carrying out various steps and processes described herein. The server 125 may include or be communicatively coupled to a data store 130 for storing collected data 115, records relating to potential incidents generated as described herein, biometric information on vehicle 101 occupants, etc. Further, the server 125 may store information related to particular vehicle 101 and additionally one or more other vehicles 101 operating in a geographic area, traffic conditions, weather conditions, etc., within a geographic area, with respect to a particular road, city, etc. The server 125 could be programmed to provide alerts and/or messages to a particular vehicle 101 and/or other vehicles 101. The server 125 could be programmed to present information to a touchscreen display 107.

A wearable device 140 may be any one of a variety of computing devices including a processor and a memory, as well as communication capabilities that is programmed to be worn on an operator's body. For example, the wearable device 140 may be a watch, a smart watch, a vibrating apparatus, etc. that includes capabilities for wireless communications using IEEE 802.11, Bluetooth, and/or cellular communications protocols. Further, the wearable device 140 may use such communications capabilities to communicate via the network 120 and also directly with a vehicle computer 105, e.g., using Bluetooth.

The wearable device 140 may include a biometric sensor 145 to collect data about a vehicle 101 occupant. For example, the biometric sensor may measure a heartbeat of a vehicle 101 occupant and/or other cardiac data, e.g., a variation in heart rate, a blood pressure, or a QT interval. The QT interval, as is known, is the measure of time between the start of the Q wave and the end of the T wave in the heart's electrical cycle. The QT interval represents electrical depolarization and repolarization of the heart's ventricles, and is a known cardiac measurement that can be distinguished between several occupants. The biometric sensor 145 may collect other biometric data, e.g., a skin galvanic response as is known.

Figure 2:
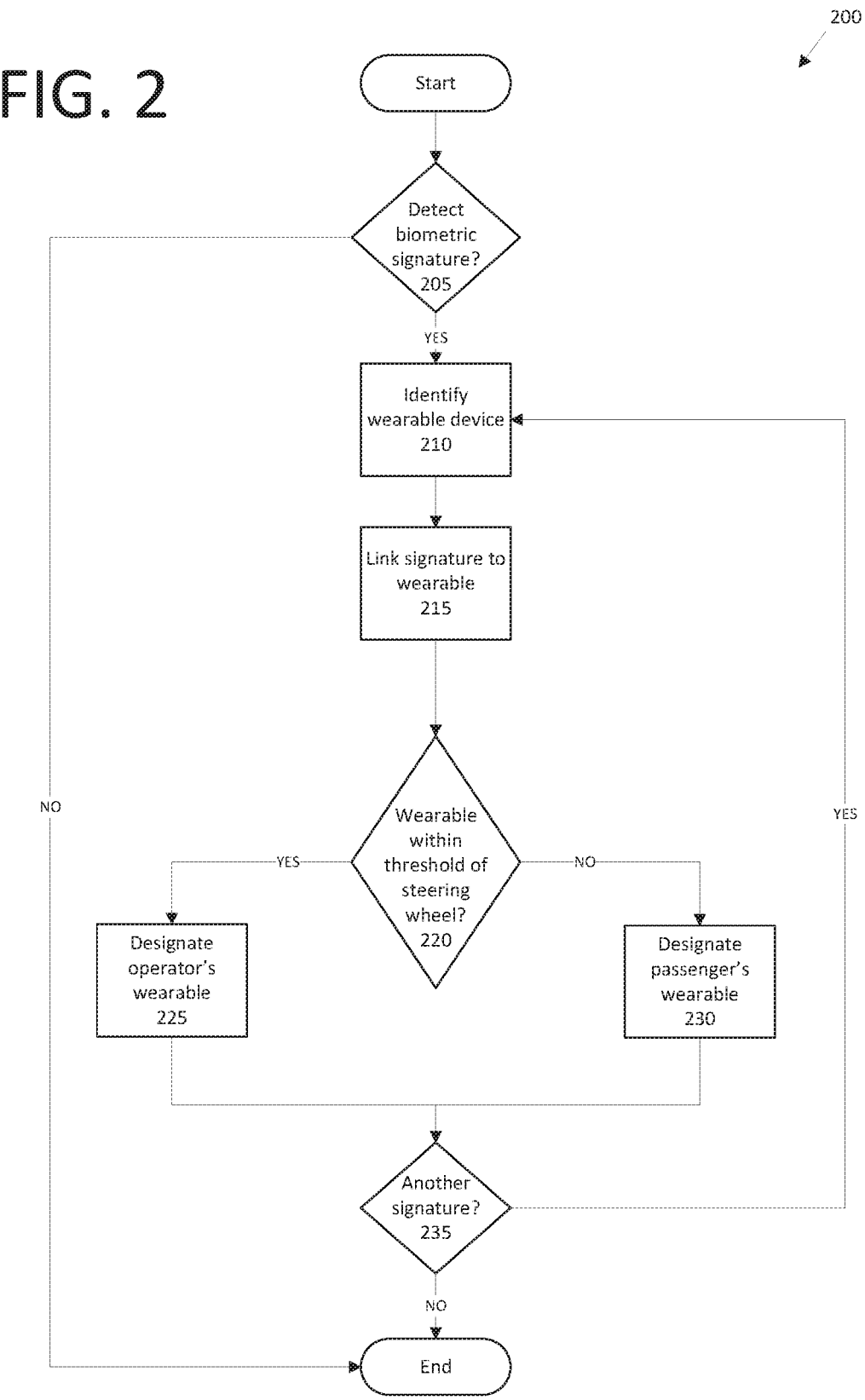
FIG. 2 is an exemplary process for determining whether a wearable device belongs to a vehicle operator or a vehicle passenger.

FIG. 2 illustrates a process 200 for determining whether a wearable device 140 belongs to a vehicle 101 operator, e.g., a driver, or a vehicle 101 passenger. The process 200 starts in a block 205, in which the computing device 105 determines whether the biometric sensor 145 detects a biometric signature. The computing device 105 may use biometric data collected by the biometric sensor 145, e.g., the QT interval, a pattern of variation in heart rate, electrocardiogram readings, blood oxygen content, blood pressure (systolic and diastolic), galvanic skin response, etc., from data indicated by the biometric sensor 145 to determine the biometric signature. The biometric signature indicates that a vehicle 101 occupant is wearing the wearable device 140 that includes the biometric sensor 145. If the biometric sensor 145 does not detect a biometric signature, the computer 105 determines that the wearable device 140 is not being worn by the vehicle 101 occupant. The computing device 105 may alternatively detect the biometric signature via a biometric sensor 110 in a vehicle 101 steering wheel. If the biometric sensor 145 (or a data collector 110) detects a biometric signature, the process 200 continues in a block 210. Otherwise, the process 200 ends.

In the block 210, the computing device identifies the wearable device 140 associated with the biometric signature detected in the block 205, i.e., the wearable device 140 that includes the biometric sensor 145 that detected the biometric signature.

Next, in a block 215, the computing device 105 links the biometric signature to the first wearable device 140, i.e., stores an association of the detected biometric signature with the first device 140 identified in the block 210. Biometric data differ between vehicle 101 occupants, and the biometric signature may be a single type of biometric data or a collection of some or all of the biometric data for a particular occupant. The computing device 105 may link the first wearable device 140 with the biometric signature.

Next, in a block 220, the computing device 105 determines whether the first wearable device 140 is near, i.e., within a predetermined threshold distance of, a vehicle 101 steering wheel. The computing device 105 may collect data 115 from one of the data collectors 110, e.g., Bluetooth proximity sensing, to determine whether the first wearable device 140 is within the threshold distance from the steering wheel. The threshold distance is established to allow a determination of whether the first wearable device 140 is close enough to the steering wheel such that the first wearable device is being worn by the operator of the vehicle 101. An exemplary threshold distance could be 80-120 mm. If the first wearable device is within the threshold distance from the steering wheel, the process 200 continues in a block 225. Otherwise, the process 200 continues in a block 230.

Figure 4:
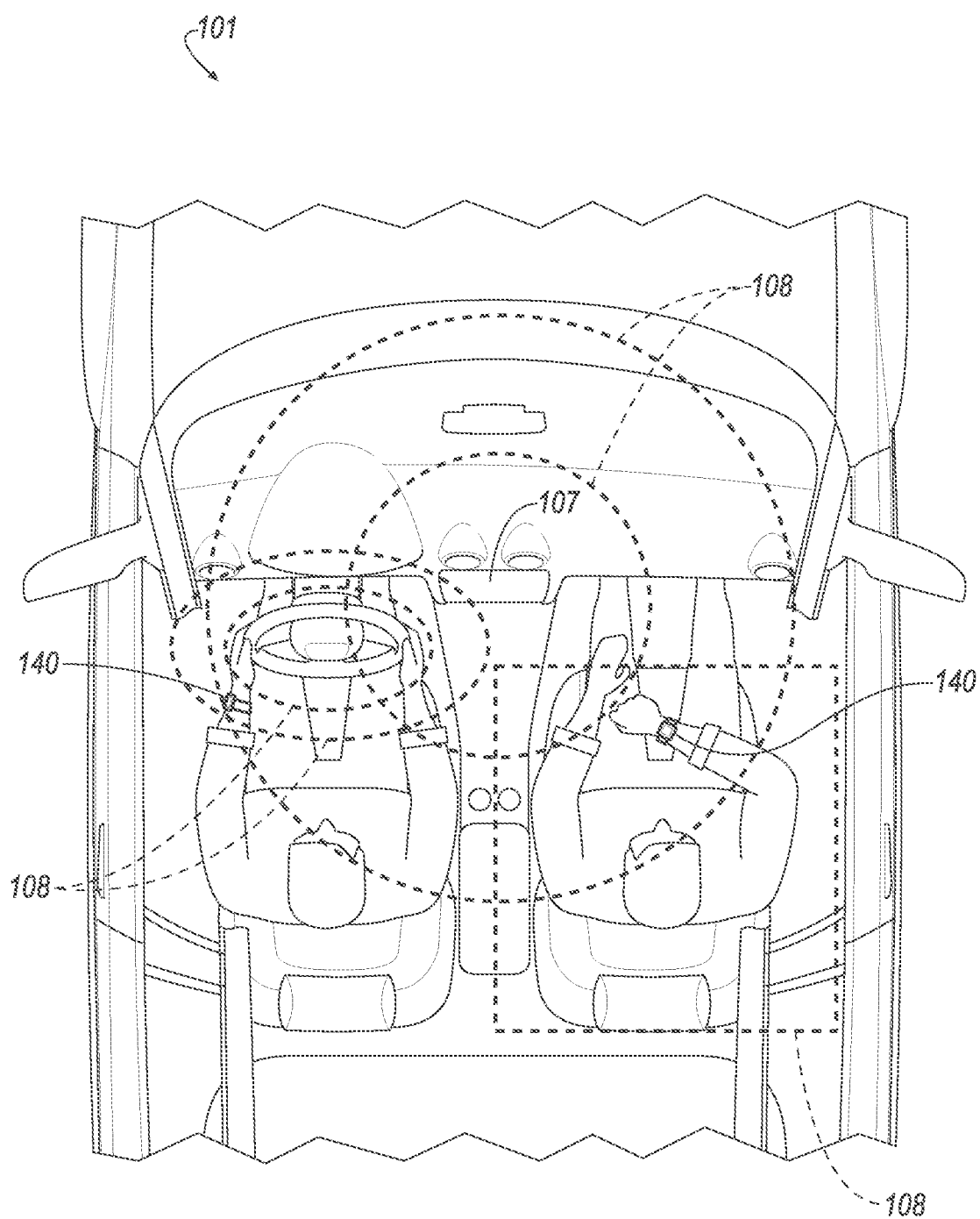
FIG. 4 is a plan view of a vehicle including occupants with wearable devices.

For example, as shown in FIG. 4, the vehicle 101 may have a plurality of detection zones 108. The detection zones 108 may include data collectors 110, e.g. Bluetooth proximity sensors configured to detect a received signal strength indicator, being a measure of the power present in a signal, e.g. a Bluetooth signal, to detect whether a wearable device 140 is within one of the detection zones 108. The detection zones 108 may be located around, e.g., a vehicle 101 steering wheel, the touchscreen display 107, and/or a vehicle seat. The detection zones 108 may be determined at least in part by the shape of the interior of the vehicle 101 and the predicted location(s) of the occupants and their wearable devices 140. For example, in FIG. 4, one of the detection zones 108 may form an annulus around the vehicle 101 steering wheel, e.g., within a range of 80-120 mm from the steering wheel. Another detection zone 108 may form an annulus around the touchscreen display 107, e.g., 290-410 mm from the display 107. Another detection zone 108 may encompass the front passenger seat, e.g., extending laterally from a passenger door armrest to a center armrest, longitudinally from a seat back to the front of a seat cushion, and vertically from the cushion to the top of a headrest. The detection zones 108 may be modified based on placement of the data collectors 110. The computing device 105 may use the detection zones 108 to determine whether the first wearable device 140 is within the threshold distance of the steering wheel and/or the touchscreen display 107.

In the block 225, the computing device 105 designates the wearable device 140 as the operator's wearable device 140. Thus, if the operator's wearable device 140 approaches the touchscreen display 107, then the operator is likely attempting to use the touchscreen display 107. The process then continues in a block 235.

In the block 230, the computing device 105 designates the wearable device 140, determined to have been at or greater than the threshold distance from the steering wheel, as a passenger's wearable device 140. Thus, if this designated wearable device 140 approaches the touchscreen display 107, the passenger, rather than the vehicle 101 operator, e.g., driver, is likely attempting to use the touchscreen display 107. In another example, the computing device 105 may further provide an instruction to a data collector 110 in a passenger's seat, e.g. an occupant classification sensor, to measure a weight present in the passenger's seat. The computing device 105 may designate the wearable device 140 a passenger's wearable device 140 only if the computing device 105 confirms that there is a weight comparable to an occupant in the passenger's seat, i.e. a passenger is present in the passenger's seat. The process then continues in the block 235.

In the block 235, which may follow either of the blocks 225, 230, the computing device 105 determines whether a second heartbeat is detected. That is, the computing device 105 searches for a second wearable device 140 with a second biometric sensor 145 detecting a second biometric signature from a second vehicle 101 occupant. For example, the computing device 105 may receive biometric information and determine that the signature is a second biometric signature if the biometric data differ from the first biometric data for a predetermined period, e.g. a heartbeat differs for a number of seconds, a number of heartbeats, etc. If the computing device 105 detects a second biometric signature, the process 200 returns to the block 210 to detect a second wearable device, or as many wearable devices and occupants as necessary. Otherwise, the process 200 ends.

Figure 3:
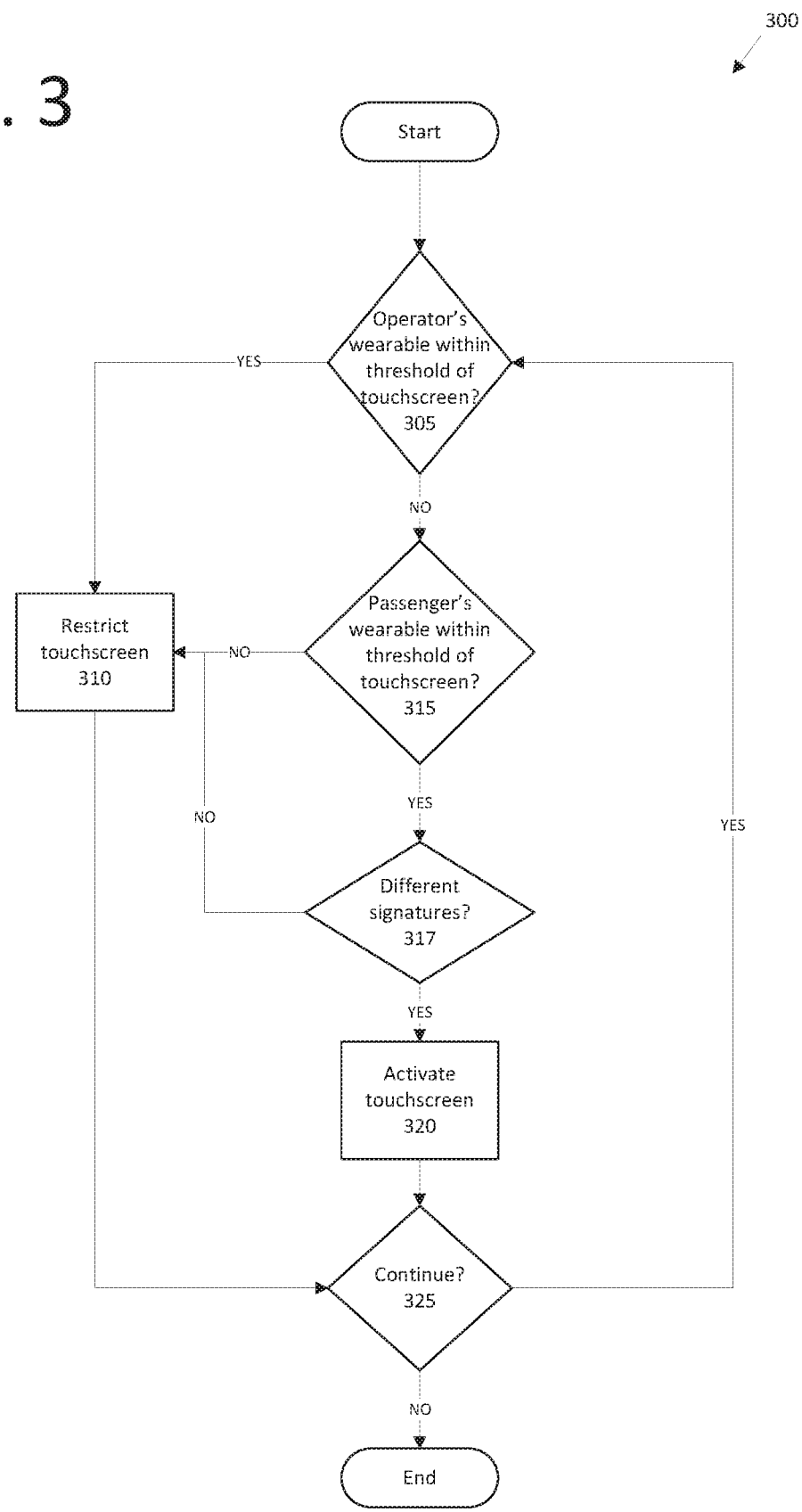
FIG. 3 is an exemplary process for allowing use of the touchscreen display according to a location of an operator wearable device is away from the touchscreen display.

FIG. 3 illustrates a process 300 for allowing use of the touchscreen display 107 based on proximity of wearable devices 140 to the display 107. The process 300 may follow or be combined with the process 200, e.g., may use the determination of whether one or more wearable devices detected as described with respect to the process 200 are associated with a vehicle 101 operator or passenger.

The process 300 starts in a block 305, in which the computing device 105 determines whether the operator's wearable device 140 is within a first threshold distance from the touchscreen display 107. The touchscreen display 107 may include a data collector 110, e.g. a Bluetooth receiving element, that detects the distance between the touchscreen display 107 and the wearable device 140. For example, the first threshold distance may indicate a distance from the wearable device 140 to the touchscreen display 107 that indicates that the operator is attempting to use the touchscreen display. The first threshold distance may be, e.g., 155-200 millimeters (mm). The distance between the operator's wearable device 140 and the touchscreen display 107 during operation of the vehicle 101 may be, e.g., 290-410 mm. The computing device 105 may alternatively determine whether the operator's wearable device 140 is within the detection zone 108 around the touchscreen display 107. If the operator's wearable device 140 is within the first threshold distance, the process 300 continues in the block 310. Otherwise, the process continues in a block 315.

In the block 310, the computing device 105 restricts operation of the touchscreen display 107. If the operator's wearable device 140 is within the first threshold distance, the operator may attempt to use the touchscreen display 107. Restricting operation the touchscreen display 107 prevents the operator from using certain functions of the touchscreen display 107 and being distracted during operation of the vehicle 101. The touchscreen display 107 may be restricted, i.e., certain functions of the touchscreen display 107 may be rendered inoperable, e.g. a navigation system, and/or a number of keystrokes within a given function may be limited. Alternatively, the touchscreen display 107 may be disabled entirely, i.e., the touchscreen display 107 will not accept any input from an occupant touching it. In another example, the display 107 is disabled by default, and if the computing device 105 does not detect both an operator's wearable device 140 and a passenger's wearable device 140 in the process 200, the computing device 105 detects only one biometric signature, or the computing device 105 does not detect a weight in the passenger's seat from the occupant classification sensor, the display 107 will remain disabled. The process 300 then continues in a block 325.

In the block 315, the computing device 105 determines whether the passenger's wearable device 140 is within the first threshold distance of the display 107. For example, the computing device 105 may determine whether the passenger's wearable device 140 is within the detection zone 108 of the display 107. The operator may wear the operator's wearable device 140 on a wrist opposite a hand closest to the display 107. Thus, the operator's wearable device may be beyond the first threshold distance but the hand without the operator's wearable device 140 may attempt to use the display 107. To prevent the use of the display 107 with the operator's free hand, the computing device 105 may be programmed to activate the touchscreen display 107 when the operator's wearable device 140 is beyond the first threshold distance and the passenger's wearable device 140 is within the first threshold distance. If the passenger's wearable device 140 is within the first threshold distance, the process 300 continues in a block 317. Otherwise, the process 300 continues in the block 310.

In the block 317, the computing device 105 confirms that the operator's wearable device 140 and the passenger's wearable device 140 detect different biometric signatures. If the passenger removes the passenger wearable device 140 and the operator wears the passenger wearable device 140, and the process 200 does not determine that both wearable devices 140 are worn by the operator, the computing device 105 may still restrict operation of the touchscreen 107. The computing device 105 may compare the biometric signature detected from the passenger's wearable device 140 to the biometric signature detected from the operator's wearable device 140, and the biometric signatures of the two devices 140 should not match for at least one of a software configurable value of consecutive heart beats, e.g. 4 beats, and/or for a software configurable duration, e.g. 4 seconds, during unrestricted screen use. If the computing device 105 confirms that the wearable devices 140 detect different biometric signatures, the process 300 continues in a block 320. Otherwise, the process 300 continues in the block 310.

In the block 320, the computing device 105 activates the touchscreen display 107, i.e., removes the restrictions and/or completely enables the touchscreen display 107. If the operator's wearable device 140 is away from, i.e., greater than a predetermined threshold distance from, the touchscreen display 107, then the operator is not going to use the touchscreen display 107, and the passengers may freely use the touchscreen display 107 as long as the passengers use a hand that brings their respective passenger's wearable device 140 within the first threshold distance. In the present example, where the touchscreen display 107 is disabled by default, the process 300 leading to the block 320 is the only manner to activate the touchscreen display 107, i.e., only if the computing device 105 detects two wearable devices 140, one worn by the operator and the other worn by the passenger, the operator's device 140 is within the threshold distance of the steering wheel, the passenger's device 140 is within the threshold distance of the touchscreen display 107, and the computing device 105 detects two biometric signatures. The process 300 in this example thus prevents the operator from circumventing the disabling of the touchscreen display 107 by wearing both devices 140 after linking one of the devices 140 with the passenger.

In the block 325, the computing device 105 decides whether to continue the process 300. If so, the process 300 returns to the block 305 to determine whether the operator's wearable device is near the touchscreen display 107. Otherwise, the process 300 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices 105 generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 200, one or more of the steps could be omitted, or the steps could be executed in a different order than shown in FIG. 2. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising a computer including a processor and a memory, the memory storing instructions executable by the computer to:
   determine a location of a first wearable device based on a first biometric signature;
   restrict operation of a touchscreen display if the location of the first wearable device is in an operator's side of a vehicle cabin and the first wearable device is within a first distance from the display;
   determine a location of a second wearable device based on a second biometric signature;
   restrict operation of the touchscreen display if the location of the second wearable device is in the operator's side of the vehicle cabin and the second wearable device is within the first threshold distance from the display; and
   restrict operation of the touchscreen display if the location of one of the wearable devices is in the operator's side of the vehicle cabin and the both wearable devices are beyond the first threshold distance from the display.

2. The system of claim 1, wherein the first wearable device includes a biometric sensor to detect the first biometric signature.

3. The system of claim 1, wherein the instructions further include instructions to detect the first biometric signature by receiving data from a biometric sensor in a steering wheel.

4. The system of claim 1, wherein the first wearable device is in the operator's side of the vehicle cabin when the first wearable device is within a second distance from a steering wheel.

5. The system of claim 1, wherein the instructions further include instructions to prevent use of the touchscreen display if the first wearable device fails to detect the first biometric signature.

6. The system of claim 1, wherein the instructions include instructions to determine the first biometric signature based on at least one of a heartbeat, a heart rate variation, a QT interval, a skin galvanic response, and a blood pressure.

7. The system of claim 1, wherein the instructions further include instructions to restrict operation of the touchscreen display if only one biometric signature is detected.

8. A method, comprising:
   determining a location of a first wearable device based on a first biometric signature;
   restricting operation of a touchscreen display if the location of the first wearable device is in an operator's side of a vehicle cabin and the first wearable device is within a first distance from the display;
   determining a location of a second wearable device based on a second biometric signature;
   restricting operation of the touchscreen display if the location of the second wearable device is in the operator's side of the vehicle cabin and the second wearable device is within the first threshold distance from the display; and
   restricting operation of the touchscreen display if the location of one of the wearable devices is in the operator's side of the vehicle cabin and the both wearable devices are beyond the first threshold distance from the display.

9. The method of claim 8, further comprising determining the first biometric signature based on at least one of the first heartbeat, a first heart rate variation, and a first QT interval, a skin galvanic response, and a blood pressure.

10. A system, comprising:
a first wearable device;
a touchscreen display;
a Bluetooth proximity sensor configured to provide data indicating a distance of the first wearable device from a steering wheel;
means for determining a location of the first wearable device based on a first biometric signature; and
means for restricting operation of the touchscreen display if the distance of the first wearable device returned by the Bluetooth proximity sensor is within a second distance from a steering wheel that is greater than zero and the first wearable device is within a first distance from the display.

11. The system of claim 10, further comprising a second wearable device and means for determining a location of the second wearable device based on a second biometric signature.

12. The system of claim 11, further comprising means for restricting operation of the touchscreen display if the location of the second wearable device is in the operator's side of the vehicle cabin and the second wearable device is within the first threshold distance from the display.

13. The system of claim 12, further comprising means for restricting operation of the touchscreen display if the location of one of the wearable devices is in the operator's side of the vehicle cabin and the both wearable devices are beyond the first threshold distance from the display.

14. The system of claim 10, further comprising means for determining the first biometric signature based on at least one of the first heartbeat, a first heart rate variation, and a first QT interval, a skin galvanic response, and a blood pressure.

* * * * *